US010850929B2

(12) United States Patent
Ronchi

(10) Patent No.: US 10,850,929 B2
(45) Date of Patent: Dec. 1, 2020

(54) APPARATUS FOR UNSCRAMBLING RANDOMLY ARRANGED CONTAINERS COMPRISING EXTRACTION MEANS INDEPENDENT OF EACH OTHER

(71) Applicant: RONCHI MARIO S.P.A., Gessate (IT)

(72) Inventor: Cesare Ronchi, Gessate (IT)

( * ) Notice: Subject to any disclaimer, the term of this patent is extended or adjusted under 35 U.S.C. 154(b) by 0 days.

(21) Appl. No.: 16/759,394

(22) PCT Filed: Oct. 25, 2018

(86) PCT No.: PCT/IB2018/058323
§ 371 (c)(1),
(2) Date: Apr. 27, 2020

(87) PCT Pub. No.: WO2019/082112
PCT Pub. Date: May 2, 2019

(65) Prior Publication Data
US 2020/0290817 A1     Sep. 17, 2020

(30) Foreign Application Priority Data

Oct. 27, 2017   (IT) .......................... 102017000122604
Oct. 27, 2017   (IT) .......................... 102017000122647

(51) Int. Cl.
*B65G 47/24*   (2006.01)
*B65G 47/90*   (2006.01)
(Continued)

(52) U.S. Cl.
CPC ............ *B65G 47/24* (2013.01); *B25J 9/1697* (2013.01); *B25J 15/0033* (2013.01);
(Continued)

(58) Field of Classification Search
CPC .. B65G 47/24; B65G 21/2072; B65G 47/901; B25J 9/1697; B25J 15/0033
(Continued)

(56) References Cited

U.S. PATENT DOCUMENTS 3,710,922 A * 1/1973 Lanphere ............. B65G 47/256
                                                    198/395
5,236,077 A * 8/1993 Hoppmann ........ B65G 47/1471
                                                    198/380

(Continued)

*Primary Examiner* — Douglas A Hess

(57) ABSTRACT

Apparatus for unscrambling articles, in particular containers (100) fed randomly to an inlet of said apparatus, comprising: a transport system (20) for transporting the articles fed to the inlet; devices (31;32) for picking and releasing the articles (100), configured to pick up the articles arranged randomly on the transport system (20) and release them to an extraction system (50) with a predefined orientation and/or position; a detection system (60) designed to detect the position and the arrangement of the articles (100) in transit on the transport system and to provide the information for controlling the pick and release devices (30); a unit (500) for processing and controlling the components and the drives of the apparatus; wherein the extraction system comprises: a plane (40;140) for supporting the containers (100); means (50;150) for extracting the articles (100), designed to pick up the articles and transport them on the plane (40) towards the outlet ("O") of the apparatus; said extraction means comprise a plurality of grippers (50;150), each comprising a pair of jaws (51;151), each gripper (50;150) being displaceable along a fixed guide (55) independently of one or more of the other grippers (50;150).

30 Claims, 6 Drawing Sheets

Figure 1:
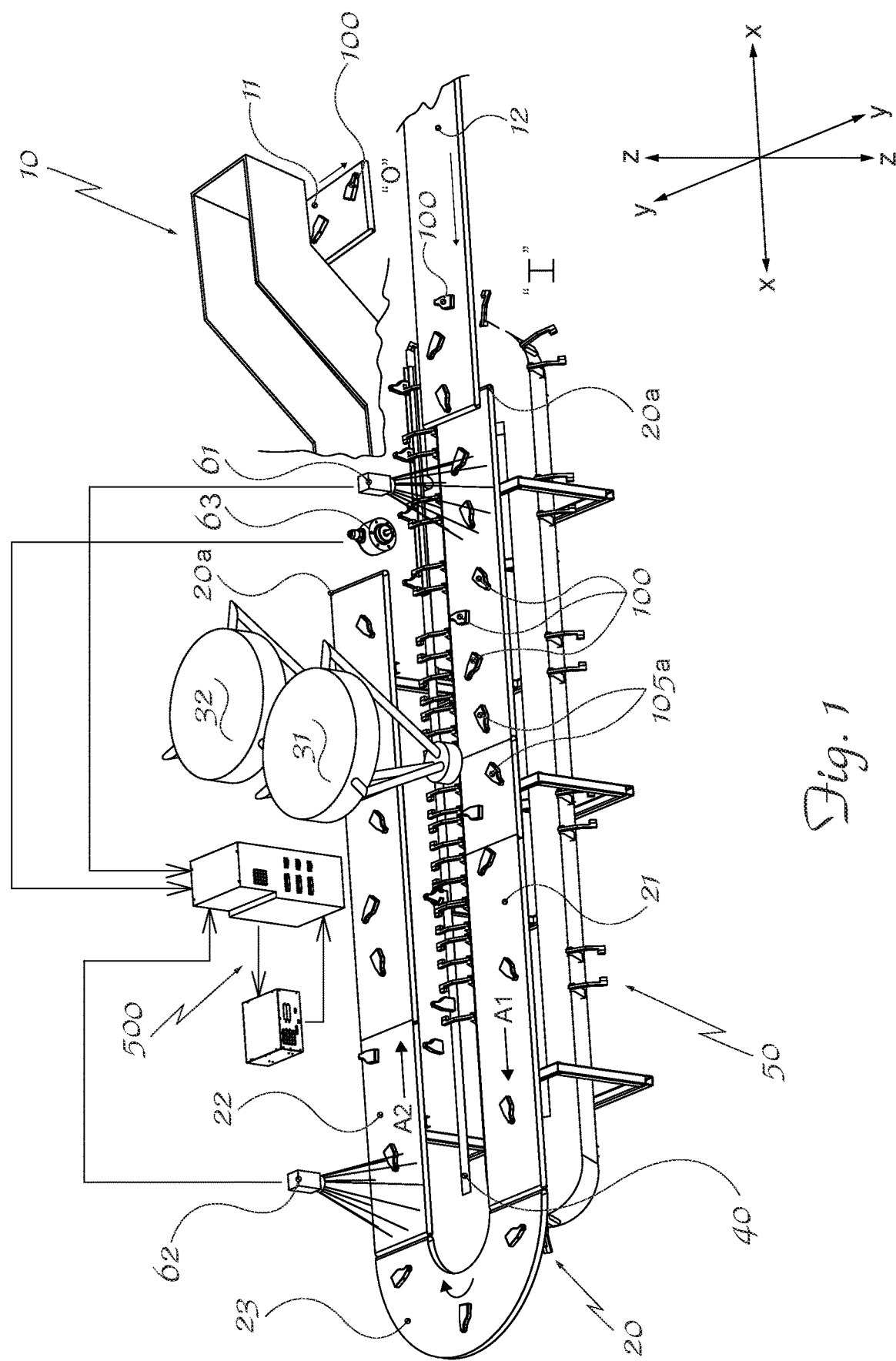

(51) Int. Cl.
 *B25J 15/00* (2006.01)
 *B25J 9/16* (2006.01)
 *B65G 21/20* (2006.01)

(52) U.S. Cl.
 CPC ....... *B65G 21/2072* (2013.01); *B65G 47/901* (2013.01); *B65G 2201/0235* (2013.01); *B65G 2203/0225* (2013.01); *B65G 2811/095* (2013.01)

(58) Field of Classification Search
 USPC .................. 198/376, 395, 398, 401, 407
 See application file for complete search history.

(56) References Cited

U.S. PATENT DOCUMENTS

| | | | | |
|---|---|---|---|---|
| 5,370,216 | A * | 12/1994 | Tsuruyama | B25J 9/1697 198/376 |
| 5,924,546 | A * | 7/1999 | Funaya | B65G 47/256 198/395 |
| 6,779,647 | B1 * | 8/2004 | Nagler | A22C 17/0093 198/395 |
| 7,591,364 | B2 * | 9/2009 | Monti | B65B 21/04 198/443 |
| 8,880,216 | B2 * | 11/2014 | Izumi | G05B 19/4182 700/228 |
| 9,272,421 | B2 * | 3/2016 | Subotincic | B25J 15/0658 |
| 9,428,344 | B2 * | 8/2016 | Di Donna | B65B 57/04 |
| 9,433,994 | B2 * | 9/2016 | Matsuyama | B65H 11/002 |
| 10,087,017 | B2 * | 10/2018 | Klotz | B65G 47/256 |

* cited by examiner

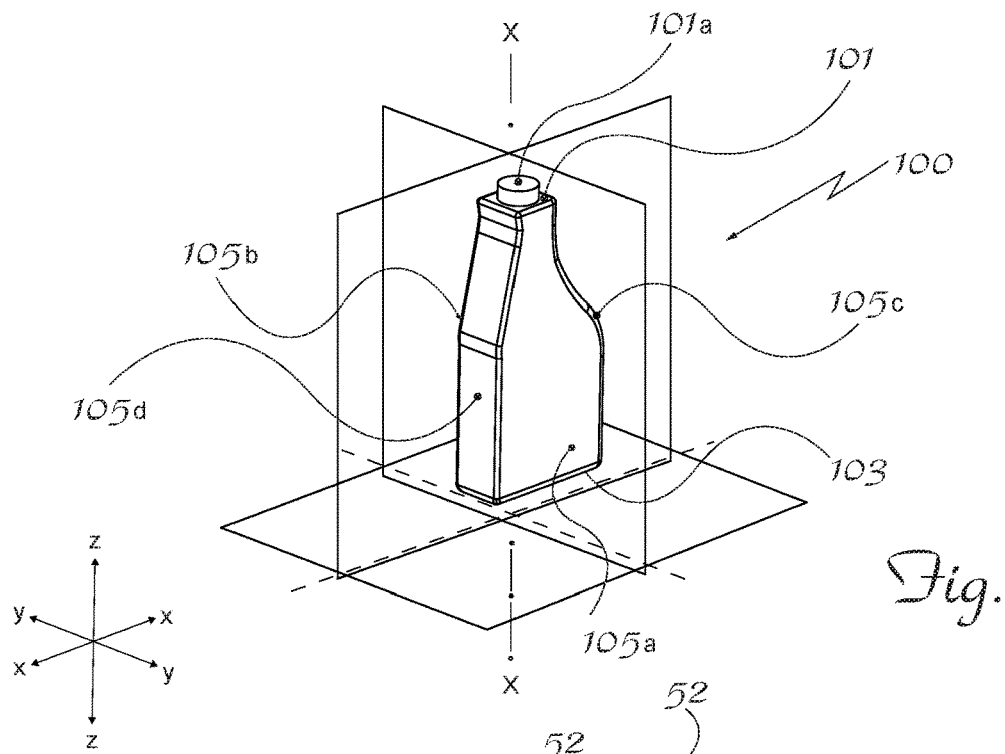
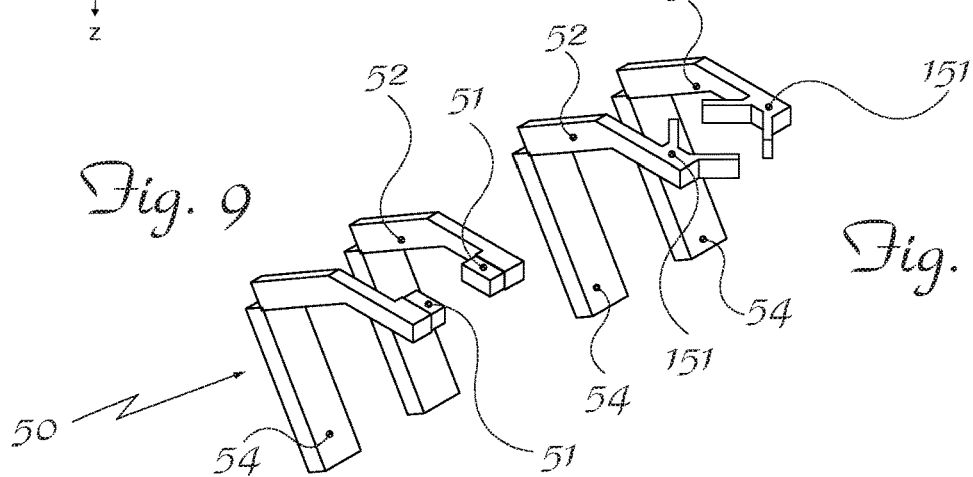
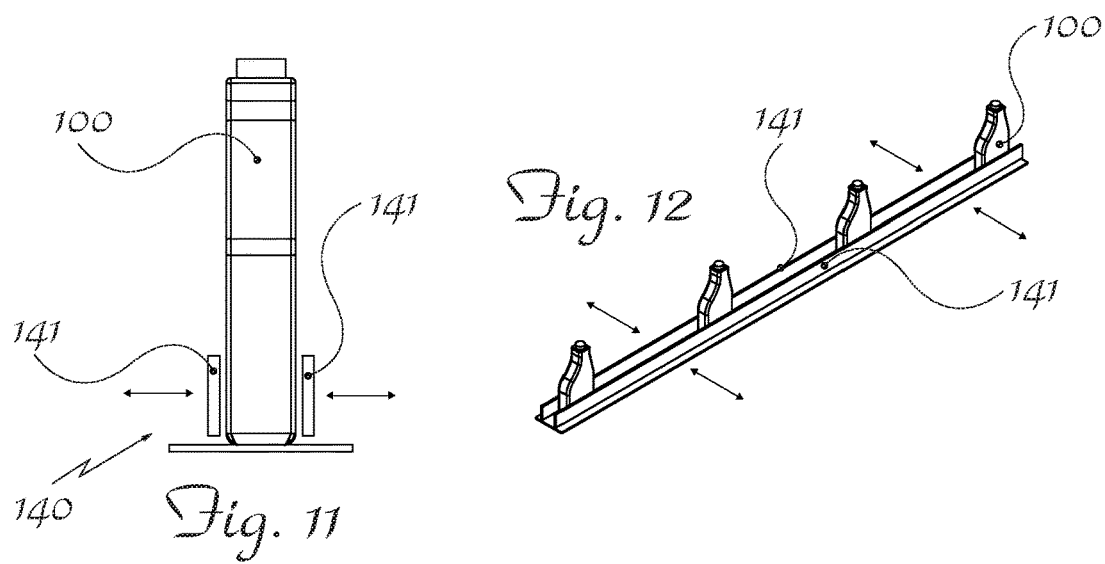

APPARATUS FOR UNSCRAMBLING RANDOMLY ARRANGED CONTAINERS COMPRISING EXTRACTION MEANS INDEPENDENT OF EACH OTHER

The present invention relates to an apparatus for unscrambling randomly arranged containers.

PRIOR ART

It is known that, in the technical sector relating to the packaging of products, for example in liquid, fluid or powder form, there exists the need to handle articles, in particular containers, which have different capacities and forms and which are fed to handling machines such as automatic filling, capping and labelling machines designed to fill, close, label and subsequently forward the articles/products for packaging.

It is also known that these automatic machines must generally be fed continuously, at regular intervals and/or at a predefined constant speed, these parameters being set depending on the requirements of said machines.

In addition, it may also be required that the containers should arrive at the automatic operating machines always in a certain—generally upright—position, i.e. with the filling opening directed upwards and/or with a specific orientation of its surfaces (conventionally identified as being front, side or rear relative to a longitudinal axis, the position of the filling mouth and/or the advancing direction through the machine), so as to allow correct handling of the article, for example necessary during labelling operations.

For this purpose, feeding apparatus—conventionally called "unscramblers"—have been developed, these apparatus being able to feed articles such as containers—which are initially arranged randomly inside hoppers—in an ordered sequence and with a predefined orientation and/or position (e.g. upright position) to said downstream operating machines. Examples of these known machines are described in WO-2013/3024 A1, EP 911 961 and EP 3 002 222, the latter describing an unscrambling machine which implements a method for grouping together individual products into groups of products and for feeding said groups of products to a packaging machine, comprising: a first conveyor which feeds a plurality of products, distributed randomly thereon; a second conveyor, comprising a linear motor including a stator and a plurality of transport units, movable independently of each other, along the stator, and each comprising at least one positioning element designed to support said group of products; a plurality of loading devices (robots) designed to pick up at least one individual product at a time from the first conveyor and deposit it in said positioning elements, wherein said positioning elements each have a plurality of predefined positions in which said devices deposit individual products and wherein said positioning elements are moved and loaded so that in a final storage area of said second conveyor there is always a plurality of positioning elements loaded and ready to feed the packaging machine in a continuous manner.

Although functional, the known unscrambling apparatus have overall a number of drawbacks which limit their actual efficiency.

A first problem arises in cases where it is required that the unscrambled articles should leave the unscrambling machine at a predefined pitch (distance between two successive articles); in the prior art this is generally achieved:

by means of complex operations performed by the pick and release robot (EP-2 911 961), which may also result in a further reduction in the unscrambling efficiency of the robots which, in order to achieve the required technical effect, must have a more complex design, with time being lost in order to set the correct output pitch of the handled articles; or by inserting along the production line a queueing station for the containers which is formed, for example, by screw feeders which are able to form queues of containers without interruptions and at a predefined pitch for the downstream filling and capping machine. The queueing station must generally have a considerable length, which is often incompatible with the spaces available in the installation locations of the entire plant.

A further drawback arises from the fact that, whenever there is a change in the shape or size of the containers, a complex format changing operation of the unscrambling machine is required, with the dropping/gripping selectors being replaced and/or the movement parameters being reprogrammed.

Another problem of the known unscrambling machines consists in the fact that, when the articles are released in an upright position onto an extraction system, in particular a movement system such as an extraction belt, they may be unstable and fall, both when they are released and during subsequent transportation towards the outlet.

Moreover, the plants and in particular the apparatus for unscrambling articles, such as containers, designed according to the prior art are substantially unable to ensure a satisfactory efficiency—closer to 100%—for the gripping, unscrambling and orderly releasing the articles randomly fed to them, since the pick and release robots are unable to manage the high number of articles which pass within their radius of action; this results in fact in a high percentage of fed articles which pass through the machine without being picked and unscrambled, said articles having to then be introduced again at the front of the unscrambling apparatus so as to pass through it again.

This problem is exacerbated by the fact that the pick and release robots are configured to perform complicated handling operations for orienting and positioning the articles before they are released, said operations taking time and penalizing the efficiency of the unscrambling machine as well as resulting in the need to use complex and costly robots which may also require more than five degrees of freedom and/or axes of rotation.

Not even the addition of further pick, unscramble and release robots is able to improve substantially the final efficiency of the unscrambling machine, resulting instead in a significant increase in the cost and complexity of controlling the apparatus, which has a complex design, is highly prone to faults affecting the mechanical components which are subject to wear, and has considerable dimensions, with the result that overall the entire production line is not sufficiently productive.

For example, the unscrambling machine described in EP 2 911 961 has a declared efficiency of 33%, namely only about one article out of three fed to the apparatus is correctly picked, oriented and output for subsequent handling.

Likewise, the management of the containers which, not having been gripped by the robots, must be introduced again at the front of the transport system is complex owing to the disadvantageous arrangement of the transport systems.

The technical problem which is posed, therefore, is that of providing an apparatus for unscrambling articles, such as randomly fed containers, which is able to unscramble said articles so that they may be fed to inlet devices of downstream operating machines, such as filling, capping or labelling machines, providing a solution to or partially overcoming one or more of the aforementioned problems of the prior art.

In particular, it is desirable that the apparatus should be able to ensure a correct output pitch of the articles being extracted and/or correct positioning, for example an upright positioning of said articles.

In connection with this problem it is also desirable that the apparatus should allow a reduction in the downtime of the machine, due to the need for a format change when there is variation in shape or size of the articles.

Moreover this apparatus must preferably have small dimensions, be easy and inexpensive to produce and assemble and be able to be easily installed at any user location using normal standardized connection means.

These results are obtained according to the present invention by an apparatus for unscrambling randomly arranged containers according to the features of claim 1 and by a method for unscrambling the articles according to the features of claim 14.

SUMMARY OF THE INVENTION

The apparatus according to the invention for unscrambling articles, in particular containers, fed randomly to the inlet thereof, comprises:
- a transport system for transporting the articles fed to the inlet, designed to transport through the apparatus articles arranged randomly on a transport plane;
- devices for picking and releasing the articles, configured to pick up the articles arranged randomly on the transport system and release them to an extraction system with a predefined orientation and/or position;
- said extraction system for extracting the articles arranged with a predefined orientation and/or position;
- a detection system designed to detect the position and the arrangement of the articles in transit on the transport system and to provide the information for controlling the pick and release devices;
- a unit for processing and controlling the components and the drives of the apparatus, designed in particular to receive the information about the position and/or arrangement of the articles and to control the pick and release devices;
- wherein the extraction system in turn comprises:
- a support plane for supporting the containers being extracted;
- means for extracting the articles, designed to pick up the released articles and transport them towards the outlet of the apparatus;
- said extraction means comprising a plurality of grippers, each comprising a pair of jaws, each gripper being displaceable along a fixed guide independently of one or more of the other grippers.

According to the invention, the transport system extends along a substantially U-shaped path with a first outward section configured to transport the containers in a first advancing direction and a second exit section configured to transport the containers in a second advancing direction different from the first direction, the two sections being connected by a curved section (23), and the support plane of the extraction system is arranged equidistant from the first outward section and from the second return section of the transport system.

Owing to the combination of the independent grippers and this configuration of the transport system and the extraction plane, it is possible to obtain a machine which has an improved efficiency and versatility as regards management of articles being extracted, while maintaining a small longitudinal extension of the machine itself, in particular owing to the transport sections, the fixed guide and the extraction plane which are shorter (substantially half the length of a linear configuration), while also reducing the number of extraction grippers and keeping the span of the pick and release devices as small as possible.

According to a preferred embodiment, each jaw of a gripper is mounted on a carriage which is displaceable on the fixed guide independently of the carriage on which the other jaw of the gripper is mounted, allowing the easy extraction of different types of articles and the associated format changes. According to a preferred embodiment, the fixed guide extends along a closed-loop path with at least two straight sections, i.e. an outward section and a return section, connected by curved connecting sections and/or the guide is inclined with respect to the plane of the transport system so as to position the first straight outward section in an upper position and the return section, opposite to the outward section, in a lower position, preferably underneath the said plane of the transport system.

According to a preferred embodiment, the jaw-carrying carriages can be operated independently of each other by means of drives which can be controlled by the processing and control unit and are preferably configured to vary the advancing speed of said carriages along the guide.

Each jaw may be mounted on a first end of a respective arm, the other end of which is joined to the respective movable carriage.

Preferably, the drive of each carriage comprises a linear motor comprising electrical windings mounted on the fixed guide and permanent magnets mounted on each carriage.

According to preferred embodiments, the jaws of a gripper have a substantially parallelepiped or frustoconical shape with a respective open, larger, base facing the other jaw of the gripper.

According to a preferred embodiment, the pick and release devices comprise at least one robot arranged upstream of the curved section, at the first section of the transport system, for picking up articles from said first section, and at least one robot arranged downstream of the curved section, at the second section, for picking up articles from the second section of the transport system.

Preferably, the advancing direction of the second return section is parallel to and substantially in the opposite sense to the advancing direction of the first outward section.

The apparatus may be configured so that the at least one pick-up robot for the first section of the transport system picks up only articles which are arranged on said first section, preferably with one or more predefined first orientations, and the at least one pick-up robot for the second section of the transport system picks up only articles arranged on said second section, preferably only articles arranged with one or more predefined second orientations different from the one or more first orientations.

A particular advantage of these configurations is that of being able to pick up and orient correctly bottles having any form (including an asymmetrical form) using universal picking members which may be simple and therefore more reliable and efficient.

According to a preferred embodiment, the one or more first orientations include an orientation in which the article is arranged on the transport system with a first side face exposed to the detection system, and the one or more second orientations include an orientation in which the article is arranged on the transport plane with a second side face, opposite to the first side face, exposed to the detection system.

Preferably, the support plane of the extraction system is arranged along the line bisecting an angle formed by the curved section.

According to a further preferred embodiment, the support plane for supporting the containers deposited by the robots comprises vertical side shoulders extending parallel to the advancing direction. The two opposite shoulders may be movable and/or motor-driven so as to be able to be displaced in the transverse direction in order to adjust the interaxial distance between said shoulders.

The support plane may be fixed or comprise a conveyor belt operated by an associated actuator so as to perform a suitable movement sequence synchronized with the movement of the robots.

Preferably, the extraction direction is parallel to and in the same sense as the advancing direction of the second transport section.

According to a preferred embodiment, the detection system comprises at least a first camera and a second camera arranged upstream of the associated robot and designed to detect the position and the arrangement of the containers in transit within its field of vision, providing information to the respective robot.

The first outward section and the second return section of the transport system are preferably configured to be operated independently and/or with different advancing speeds.

The curved connecting section may in turn be configured to be operated independently and/or with a different advancing speed compared to the first and/or second section of the transport system.

According to a preferred embodiment, the apparatus comprises at least one picking and handling robot arranged and configured to operate on articles in transit on the curved connecting section of the transport system.

The method for unscrambling articles according to the invention comprises the steps of:
 feeding the randomly fed articles to a transport system and transporting the articles arranged randomly on a transport plane;
 detecting the position and arrangement of the articles in transit on the transport system and emitting corresponding position and arrangement information;
 picking up the articles arranged randomly on the transport system, based on the position and arrangement information emitted;
 releasing with a predefined orientation and/or position the picked-up articles to an extraction system;
 gripping each article released with a predefined orientation and/or position by extraction means for extracting the articles;
 extracting the articles arranged with a predefined orientation and/or position by means of the extraction system;
 the steps of gripping and extracting the released articles are performed by means of a plurality of grippers, each comprising a pair of jaws between which an article is gripped; and by displacing each gripper along a fixed guide independently of one or more of the other grippers, the fixed guide being preferably inclined at an angle with respect to the transport plane and/or the support plane of the extraction system.

According to the invention, the method for unscrambling the articles involves the transportation of the articles by the transport system along a substantially U-shaped path with a first outward section, on which the containers are transported in a first advancing direction, and a second exit section, on which the containers are transported in a second advancing direction different from the first direction, and a curved section which connects the first section and the second section, and release and/or extraction of the articles takes place at and/or at least partly along an extraction plane which is equidistant from the first outward section and the second return section of the transport system and is preferably arranged along the line bisecting an angle spanned by the curved section.

According to a preferred embodiment, each jaw of a gripper is displaced along the fixed guide independently of the other jaw of the said gripper. One or both of the jaws of a gripper may vary their speed during movement along the guide.

According to a preferred embodiment, the movement of a gripper or a jaw along the fixed guide follows a closed-loop path with at least two straight sections, i.e. an outward section and a return section, connected by curved connecting sections.

According to a preferred embodiment the movement of the jaws of a gripper is coordinated with the release of an article by the pick and release devices, so that the jaws are arranged in a first spaced position upon arrival of the article on the support plane and then in a second closed position for gripping the article.

Preferably the extraction step comprises transportation of the article performed by displacing the jaws closed around the article towards the outlet and subsequent release of the article by the jaws.

According to a preferred embodiment, the release of the article by the jaws comprises entry of the jaw arranged downstream in the extraction direction along a curved return section of the inclined guide, continuation of the article towards the outlet, and entry of the upstream jaw along the curved return section of the inclined guide.

According to a further preferred aspect of the invention, the pick and release step is performed by at least one robot arranged at the first section for picking up articles from the said first section and by at least one robot arranged to pick up articles from the second section of the transport system. Advantageously, the advancing direction of the second return section may be substantially opposite and parallel to the advancing direction of the first outward section.

According to preferred embodiments, the first section, the second return section and/or the curved section of the transport system are operated independently and/or with different advancing speeds.

Figure 2:
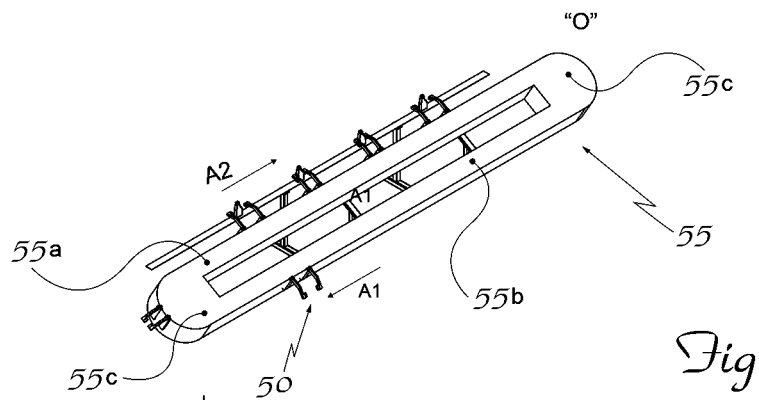
Figure 3:
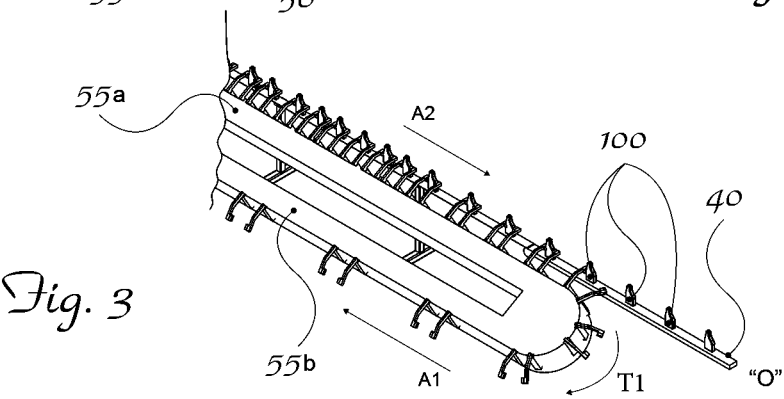
Figure 4:
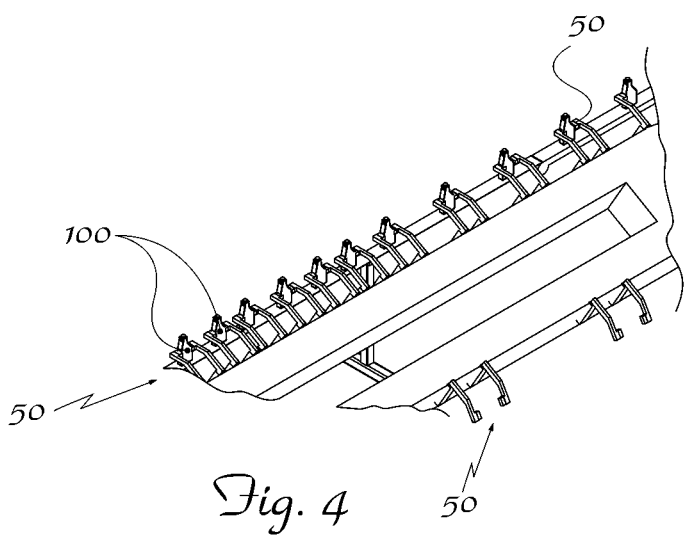
Figure 5:
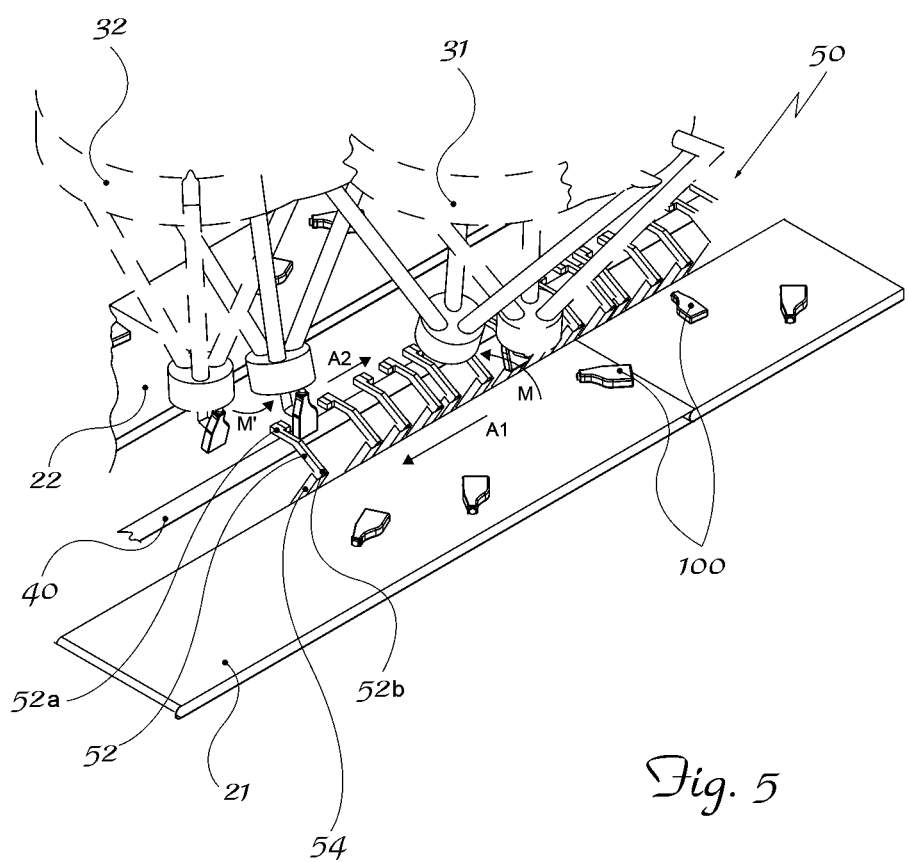
Figure 6:
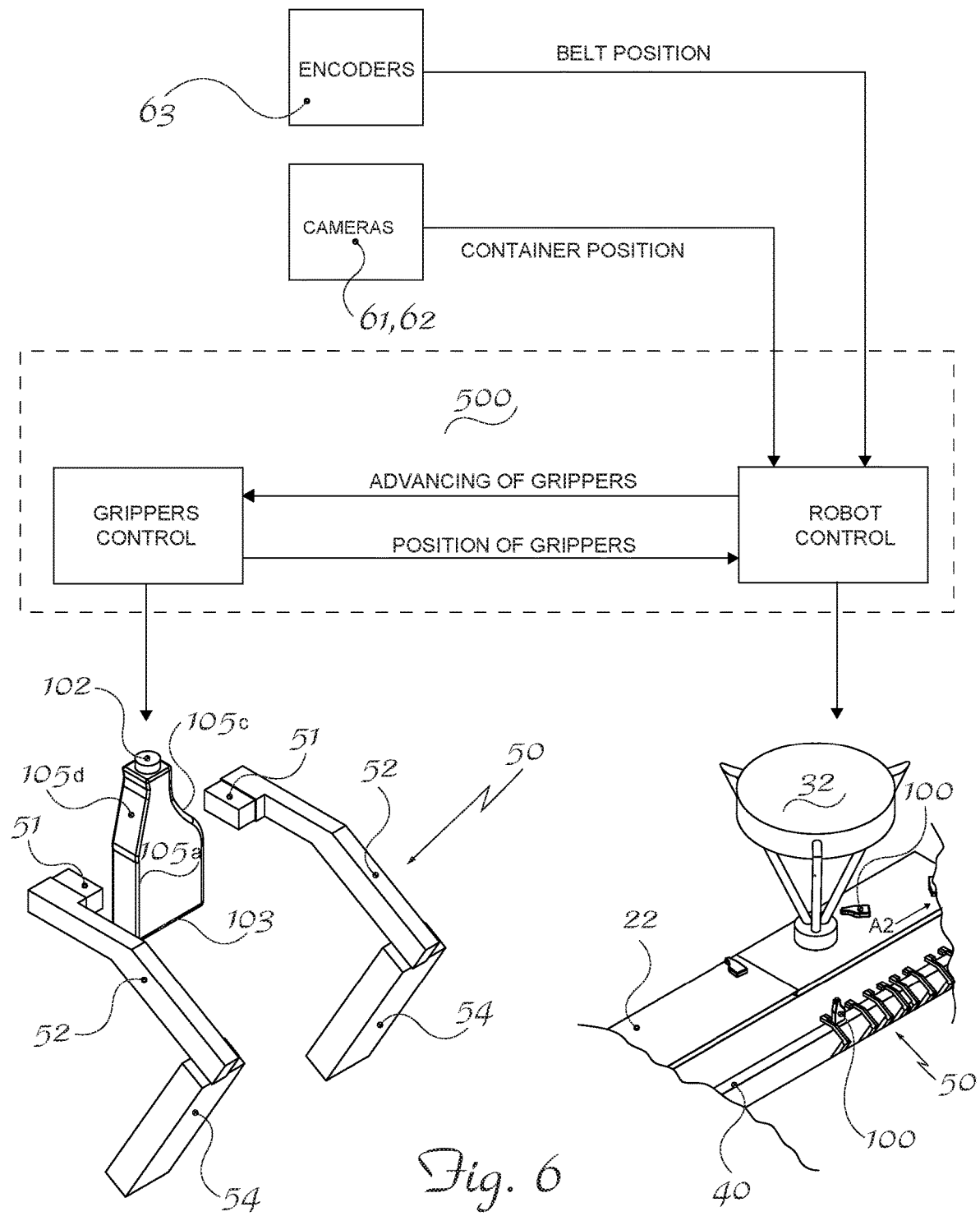
Figure 7:
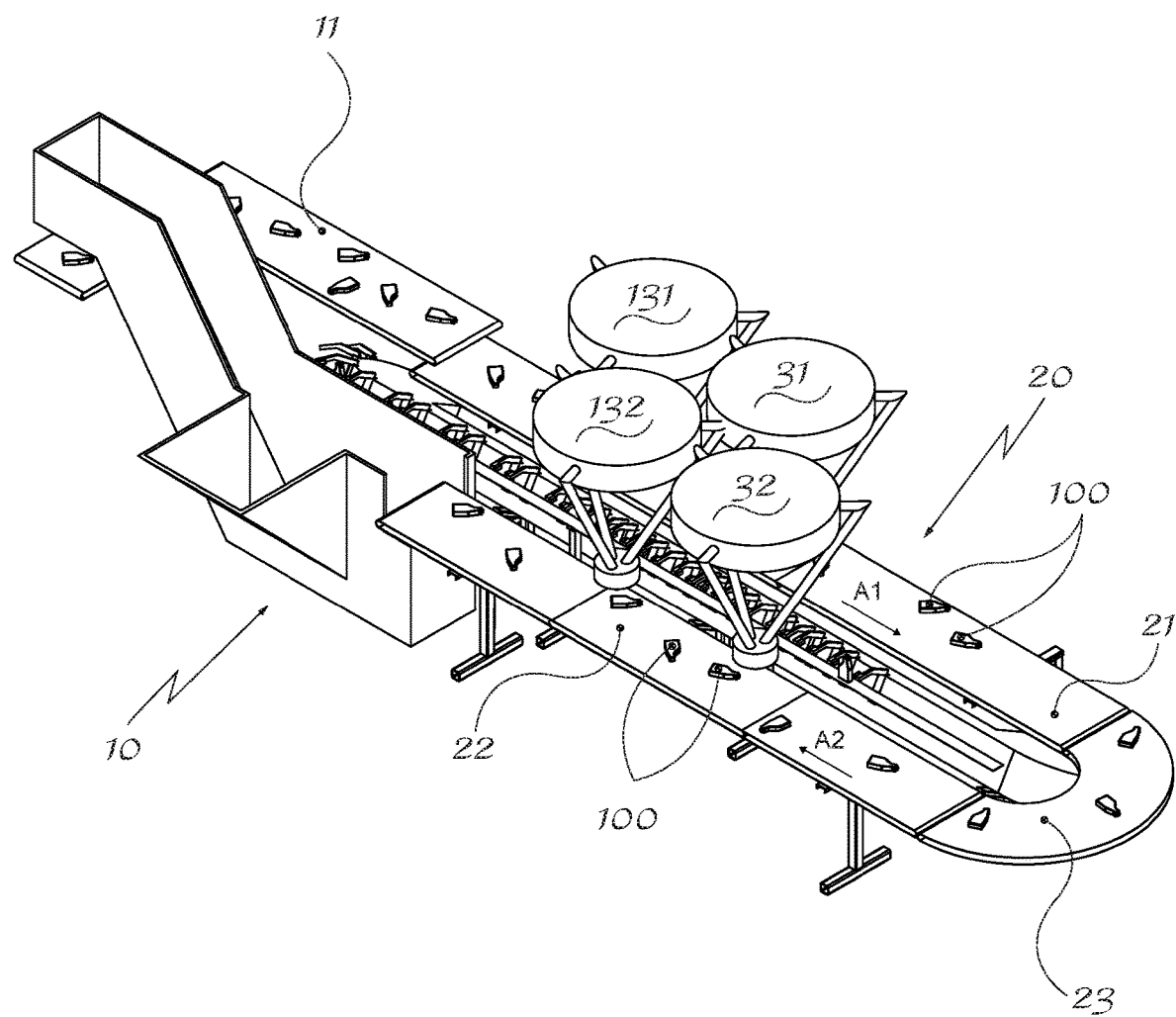

Further details may be obtained from the following description of non-limiting examples of embodiment of the subject of the present invention provided with reference to the case where the articles to be unscrambled are containers, such as bottles containing a product, and to the attached drawings, in which:

FIG. 1: shows a perspective view of a first example of embodiment of the unscrambler apparatus according to the present invention; and FIG. 2: shows a perspective view of the device for gripping and transporting the containers towards the outlet of the apparatus;

FIG. 3: shows a perspective view of the device for gripping and transporting the containers towards the outlet of the apparatus during release and return of the gripping means;

FIG. 4: shows a perspective view of the device for gripping and transporting the containers towards the outlet of the apparatus during a change in the spacing interval of the gripping means;

FIG. 5: shows a perspective view of the robots during release of the oriented containers;

FIG. 6: shows a block diagram of the operating cycle for picking, orienting and delivering to auxiliary transport means the oriented containers;

FIG. 7: shows a perspective view of a variation of an example of embodiment of the apparatus according to the invention; and FIG. 8: shows a perspective view of an example of an asymmetrical container;

FIGS. 9,10: show examples of a variation of embodiment of the grippers for gripping and transporting oriented containers; and FIGS. 11,12: show a front view and side view, respectively, of a variation of embodiment of the temporary support plane for the oriented containers.

As shown in FIG. 1 and assuming solely for the sake of easier description and without a limiting meaning a set of three reference axes respectively along a longitudinal lengthwise direction X-X parallel to an advancing direction "A" of containers along the apparatus, transverse widthwise direction Y-Y of the apparatus perpendicular to said advancing direction, and vertical heightwise direction Z-Z of the apparatus perpendicular to the other two directions, as well as a part "I" for entry of the containers into the apparatus and a part "O" for exit of the containers therefrom, the unscrambling apparatus according to the invention substantially comprises:

a transport system for transporting through the apparatus containers randomly arranged on a transport plane.

In the example shown, the transport system comprises a conveyor belt 20 for supporting and transporting through the apparatus containers 100 randomly supplied by an external device 10. Said conveyor belt 20 extends advantageously substantially in the form of a "U" with a first outward section 21 and a second return section 22 connected by a curved connecting section 23, the first section 21 moving (FIG. 1) along a first advancing direction and sense A1 and the second section 22 moving along a different direction A2, in the example parallel to and in a sense substantially opposite to the advancing direction A1 of the first outward section 21;

devices 30 for picking and releasing the articles 100, which are arranged and configured to pick up the articles arranged randomly on the transport system and release them with a predefined orientation and/or position to an extraction device 50; according to a preferred embodiment of the invention, the pick and release devices 30 comprise at least one robot 31 arranged at the first entry section 21 of the transport system, upstream of the curved section 23, and configured to pick up articles from said first section 21, and at least one robot 32 arranged at the second return section 22 of the transport system, downstream of the curved section 23, and configured to pick up the articles 100 from said second section 22.

The robots 31,32 are therefore arranged at a suitable distance in the vertical direction Z-Z and transverse direction Y-Y from the respective belt of the first or second section 21,22 so that an operating area thereof comprises a respective portion of the respective belt section 21;22;

the extraction system for extracting the containers 100 from the apparatus is designed to receive the containers released by the devices 30 and extract them from the apparatus along an extraction direction, arranged with a predefined orientation and/or position which is generally dictated by the requirements of the operating machines situated downstream of the unscrambling machine.

In the non-limiting example shown, the extraction system comprises:

a support plane 40 for supporting the containers 100 being extracted, on which the containers may be deposited, for example by the robots 31,32, with a predefined orientation and/or position;

means 50 for transporting the containers 100, designed to pick up the containers released by the robots 31,32 and transport them on the plane 40 in the extraction direction towards the outlet "O" of the apparatus.

a detection system 60 for detecting the position and the arrangement of the articles 100 in transit on the transport system and for providing the information for controlling the pick and release devices.

In the preferred embodiment shown, this system comprises at least a first camera 61 and a second camera 62, each arranged upstream of the associated robot 31,32 in the advancing direction A1,A2 and respectively able to detect the position and the arrangement of the containers 100 in transit on the transport plane within its field of vision, providing the information for controlling operation of the respective robot. Cameras of this type are known in the sector of unscrambling machines and are not described in greater detail.

The detection system 60 may preferably comprise also means 63 for measuring the advancing movement of one or more sections of the transport system, schematically shown here (FIGS. 1,6) with an encoder 63 associated with the means for moving the belt 20.

As schematically shown in FIG. 2, the apparatus may also comprise a unit 500 for processing and controlling the components and the operation of the apparatus, for example configured to receive the detection signals provided by the detection system 60 and consequently control the movement of the robots 31,32 for picking up the containers 100 from the transport system 20 and releasing them to the extraction system 40,50.

According to preferred embodiments, it is envisaged that the entry belt forms a closed loop on the rollers 20a, at least one of which is motor-driven by means of a gearmotor, so as to form a an upper outward plane and a lower return plane.

It is also preferably envisaged that the U-shaped transport system may be formed by three independent belt portions (outward section 21, curved section 23 and return section 22), each of which can be operated independently of the other ones so as to determine different advancing speeds, giving rise to advantages in terms of efficiency, which will become clear below with reference to operation of the apparatus.

A particularly advantageous embodiment of the unscrambling apparatus of the invention is that where the extraction system comprises a plane 40 for supporting the containers released by the pick and release devices 30, which is arranged between the two sections of the "U" in a position equidistant from the first outward section 21 and from the second return section 22 of the transport system. This allows the configuration of a simplified system for management of the movements of the pick and release robots 31;32 associated with the respective first transport section 21 and second transport section 22, which robots therefore do not need to perform complicated rotary translational movements M, M' (FIG. 5) with a long trajectory along multiple axes (in particular at least 3 axes), with a consequent simplification of the component parts and the processing and control system of the unscrambling machine, as well as greater efficiency of the robots 31,32 and in general of the pick-up, unscrambling and release cycle.

Preferably, the extraction direction is parallel to and in the same sense as that of the second section 22 of the transport system. Preferably, the extraction plane 40 is coplanar with the transport plane 20.

The preferred embodiments shown in FIGS. 1 and 4 have a curved section of the U-shaped transport system which covers an angle of approximately 180°, with advancing directions of the first outward section 21 and the second outward section 22 which are parallel and in the opposite sense; this configuration is optimum since it allows limitation of the overall dimensions in the transverse direction Y-Y of the apparatus and further simplification of the movements of the robots 31,32, as well as arrangement of the extraction system so that the containers 100 oriented and/or positioned at the outlet of the apparatus advance, for example on the support plane 40, in a direction which is also parallel to the advancing directions A1,A2 of the first transport section 21 and the second transport section 22. The apparatus according to the invention is, however, not strictly limited in this sense, it being possible to arrange the transport system in the form of a "U" which is more open, for example with a curve having an angle greater than 160°, and optionally arranging the extraction system so that the extraction/exit direction of the containers 100 extends along the line bisecting the angle of the curved section 23, in this way maintaining the symmetry of movement of the robots 31 associated with the first section 21 and the robots 32 associated with the second transport section 22.

For the sake of easier description a container 100, defined as asymmetrical, since it is characterized by an irregular form such as that shown in FIG. 8, is described here.

The container has a form with a neck or mouth part 101—intended to receive a closing cap—arranged in an eccentric position with respect to the body 102 of the container.

Each container 100 is provided with a filling opening 101a which normally may have a circular form, with a main (or longitudinal) axis X-X, generally aligned with the greater dimension of the container, which may be perpendicular to said filling opening 101a and passing through the centre thereof, or axially offset with respect to the latter.

Each container 100 may have a bottom surface 103 which, in turn, may be perpendicular to said axis X-X and designed to support the container in the upright position.

The container also has a first side surface 105a and a second side surface 105b, situated opposite each other in the transverse direction Y-Y, as well as a front end surface or side 105c and a rear end surface or side 105d situated opposite to the front surface or side.

The front end surface 105c is generally that which, at the outlet of the apparatus, must be directed forwards, in the same sense as an advancing sense towards the outlet, for example towards downstream handling machines which may be designed to fill the container or apply a label to a predefined surface of the two side surfaces (for example the surface 105b) which, once the packaging has finished, must always bear the label and therefore must always be directed on the same side in the direction Y-Y transverse to the container. It will be evident to the person skilled in the art that the front side 105c may also not have a surface, but be in the form of a line joining together the two opposite side surfaces 105a, 105b.

For unscrambling of the articles, in particular in the case of asymmetrical articles such as the container 100 described by way of example, the apparatus may be advantageously configured so that the at least one robot 31 for picking up the articles from the first transport section 21 is set to pick up only articles arranged on the first transport section 21 with one or more predefined first orientations, and the at least one robot 32 for picking up the articles from the second transport section 22 is set to pick up only articles arranged on the second transport section 22 with one or more predefined second orientations different from said one or more first orientations. With reference to the example of the container 100 shown above, this may, for example, be realized by configuring the apparatus so that the pick-up robot 31 of the first section 21 is controlled so as to pick up the containers which, arranged randomly on the first transport section 21, have the first side face 105a exposed to view at the top and the robot 32 of the second section is controlled so as to pick up containers which have instead the second opposite side face 105b exposed to view at the top.

As shown in FIGS. 2-6, the transport means 50 for picking up the containers 100 and transporting them on the support plane 40 comprise a plurality of grippers 50, each comprising a pair of jaws 51. The grippers 50 are displaceable independently of each other.

As shown, each jaw 51 is mounted on a first end 52a of a respective arm 52, the other end of which is joined to a carriage 54 displaceable on a fixed guide 55.

The guide 55 has an extension which forms a closed-loop path with straight sections, i.e. an outward section 55a and return section 55b, which are connected by curved connecting sections 55c.

As shown, the guide 55 is preferably arranged inclined with respect to the plane of the conveyor belt 20 and/or the extraction plane 40. This allows relative interference between the grippers 50 and one or both planes 20,40 to be avoided.

In particular, the guide 55 is preferably arranged so as to position:
  the first straight section 55a in an upper position, preferably substantially coplanar with the extraction support plane 40, and
  the opposite straight return section 55b in a lower position, preferably underneath the said plane of the conveyor belt 20.

With this relative positioning and as shown in FIG. 3, it is possible to avoid relative interference between the two elements, allowing the grippers and in particular the single jaws to follow without obstacles the curved section 50 leading into the straight return section 55 which in turn does not interfere with the transport plane 20 for the containers.

A particularly preferred inclination of the fixed guide which is able to achieve these advantages is between 15° and 45°, and is preferably equal to about 30°.

Preferably, the carriages 54 are movable independently of one another by means of drives controlled by the central unit 500 which is also preferably able to vary the advancing speed of the said carriages 54 along the different sections of the guide 55.

According to a preferred embodiment, the driving system for the carriages comprises a linear motor comprising electric windings which are mounted on the fixed guide 55 and preferably extend over the whole length of the guide and permanent magnets arranged inside the single carriages 54.

With this configuration, the magnets and therefore the carriages are moved and controlled in terms of position and speed by the magnetic field generated by the aforementioned fixed windings.

Such operation allows the jaw-carrying carriages to be moved with speeds independent of each other and their advancing speed to be varied along the extension of the guides 55.

A further example of embodiment may have instead an electric motor on-board each carriage, an output shaft of which has a pinion designed to mesh with a linear rack mounted on the guide circuit 55.

With this configuration and as shown in FIGS. 1, 5, 6 the operating principle of the apparatus is as follows:

- the containers 100 are fed randomly to the first section 21 of the input belt 20;
- advancing in the first advancing direction in the sense A1 they cross the field of vision of the first camera 61, which detects the position of the container on the said first belt 21 and its arrangement (orientation) on the transport surface of the first section 21—for example defined by the orientation of the front end face 105c and rear end face 105d and/or by the position of its side faces 105, 105b, respectively hidden since resting on the belt 20 and visible at the top.
- the information relating to the position and arrangement of the container 100 on the transport plane 20 is sent to a central unit 500 which, if necessary correlating this information with the measurement information about the advancing of the belt, causes the activation of the first robot 31 which is authorized to pick up, for example, only the containers which have a certain first orientation on the surface of the first conveyor belt 21, said orientation being associated for example with the presence of the first side surface 105a which is visibly exposed, while allowing the other containers to pass by;
- the first robot 31 picks up the selected containers and handles them in such a way as to position them in an upright position, with the filling neck and opening in the upper position and the front end face 105c correctly directed in the predefined direction for extraction towards the outlet;
- continuing along the path defined by the conveyor belt 20, the containers 100 which are left travel around the curved section 23, reach the second section 21 of the "U" and, after reversal of the advancing direction A2, pass into the field of vision of the second camera 62 which detects the position and the orientation along the second section 22 of the "U";
- most of the containers 100 detected on the second transport section 22 will now be formed by those containers the orientation of which was different from (opposite to) the first orientation which can be managed by the first robot 31 and which were therefore ignored by the first robot 31 during their transit along the first section 21; these containers 100, however, have varied their advancing direction after passing around the curved section 23 and are therefore oriented in a spaced arrangement which the second robot 32 is able to manage with a greater speed and precision;
- the control unit 500 therefore authorizes the second robot 32 to pick up said containers 100 arranged with said second orientation;
- the robot 32 picks up the containers 100 and handles so as to bring them into an upright position with the filling neck 102 in the upper position and front end face 105c correctly directed in the same sense as the predefined extraction direction;
- once the container has been gripped and oriented, the container is released to the extraction system for picking up by the grippers 50 and preferably deposited on the output plane 40;
- at the same time or in any case in a manner coordinated with the release of the container 100 in an upright position by the robot 31, the two jaw-carrying carriages 54 of the gripping gripper 50 arrive and, acting in synchronism controlled by the central unit 500, arrange the corresponding jaws 51 on opposite sides of the container 100 in the extraction direction and close the gripper 50 around the container 100, picking it up for transport towards the outlet "O";
- at the outlet "O" the grippers 50 may easily release the container 100 (FIG. 3) which is correctly oriented, in an upright position and spaced by the correct amount from adjacent containers 100; as schematically shown in FIG. 3, advantageously the preferred inclined guide 55 with curved section 55c allows each jaw 51, which moving independently of the other jaw of the gripper 51 frees the container 100, to follow a trajectory T1 which lies in an inclined plane with respect to the support plane 40 for extraction of the container 100, therefore not interfering with the latter or with an adjacent container.

The possibility of moving the grippers 50 independently of each other allows the following to be obtained:

- each carriage reaches the position for gripping the container 100 deposited by either one of the robots 31,32 in synchronism therewith, favouring gripping and reducing the risks of the container falling when it is transferred to the gripper and deposited on the plane 40.
- a speed adapted to the pick and release time of the robot 31, which time depends on the format of the container and its random position on the conveyor belt;
- an output speed compatible with the operating speed of the automatic downstream machine, independently of operation of the robots 31,32;
- variation of the spacing pitch of the grippers as shown in FIG. 4, namely the distance present between one gripper and another gripper which is adjacent upstream or downstream in the advancing/extraction direction, this being advantageous both during gripping of the container released by the robots 30 and in particular during extraction towards downstream operating machines which must be fed with a specific pitch between successive articles, which varies from machine to machine. The apparatus is therefore easily adaptable also to production lines with pre-existing downstream operating machines.

In addition to all the advantages illustrated above the preferred configuration in which the single jaws 51 may be moved independently of each/other and with different speeds, owing to the possibility of operating independently the jaw-carrying carriages 54 of the grippers 50, gives rise to further advantages:

- each carriage may determine different activation of closing of the gripper depending on the different types of container, for example closing symmetrically the jaws, or keeping the upstream jaw immobile and closing only the downstream jaw in the advancing direction; therefore all the problems and downtime associated format changes are eliminated;

it is possible to release the container to downstream extraction systems, releasing each jaw 51 of a gripper individually without relative interference, and preferably along a trajectory which lies in a plane (parallel to the plane of the inclined guide 55) which is inclined with respect to the plane 40 supporting the container;

it is possible to increase significantly the speed along the return section 55b of the guide in order to create a flywheel of grippers ready for gripping.

As shown in FIGS. 9 and 10 the jaws 51 of the gripper 50 may be constructed in the form of a first substantially parallelepiped embodiment or second alternative embodiments 150 such as for example a frustoconical form 151 with respective larger base open towards the container and situated opposite the other jaw, in order to facilitate the connection with and the gripping of containers with different formats and size.

The advantages arising from the particular U-shaped configuration of the conveyor belt 20 are many; with said configuration in fact the following may be obtained:

an entry zone "I" for the containers and a return zone "O" for them arranged on the same side as the entry zone "I"; consequently any containers which have not been picked up return automatically randomly to the feeding machine and from here enter again into circulation.

the U-shaped form comprising a first outward section and a second return section with reversal of the advancing direction A1, A2 allows the first robot to pick up all and only the containers oriented with a certain first orientation, leaving the second robot with the task of picking up all and only the containers oriented in the opposite direction, with the result that it is possible to reduce the degrees of freedom and the number of axes of the two robots which may in this way move always along a single sense in the transverse direction Y-Y so as to transfer the respective containers to the extraction system, the robots being no longer required to perform complicated rotary translation movements with a long trajectory on multiple axes (in particular at least 3 axes);

in addition to this, the U-shaped form of the conveyor belt enables a pick-up efficiency greater than 50% to be obtained since the robot 31 of the first section 21 may remove all and only the containers arranged with one or more first orientations, leaving the robot 32 of the second section 22 with the task of picking up all and only those containers which are left, reducing the number of containers which pass under the two robots without being picked up;

in a variation of embodiment, it is also possible to envisage that the conveyor belt/system 20 is made with three segments—outward section 21, curved connecting section 23, return section 22, which are independent of each other and operated by controls and drives which are also independent, this giving rise to the further advantage; owing to the fact that robots 32 of the second section 22 must manage and if necessary pick up a small number of containers (on average 50%) compared to the number of containers which pass along the first section 21, it is possible to reduce the working speed of the robots and/or the speed of advancing movement to the advantage of the pick-up precision and therefore the final number of containers which are correctly handled;

in this configuration it is also possible to provide a third robot (not shown) associated with a corresponding camera and arranged above the curved connecting section 23 with the specific function of performing a pre-orientation of the containers which reach the return section 22 of the conveyor belt, thus favouring further the capacity and therefore the pick-up speed of the second robot and therefore overall of the entire apparatus. For example, this robot for the curved section 23 may be designed to re-orient the containers 100 which are arranged with said first orientation and which the robot 31 of the first section 21 was unable to pick up, so as to arrange them with said second orientation which may be managed by the robot 32 of the second section.

As shown in FIG. 1, it is envisaged that the means for separating the containers 100 may be arranged upstream of the conveyor belt, these means for example comprising an auxiliary belt section 120 which is operated independently of the first section, both during the advancing movement in a sense A1 the same as that of the outward section 21 and in the transverse direction Y-Y with an alternating movement for introducing a vibration which, when the containers fall on the belt 20, helps prevent several containers from being arranged on top of each other; this superimposed arrangement in fact makes it difficult or impossible to recognize the orientation of the containers which therefore cannot be picked up by the robots, reducing the efficiency of the machine which is instead increased by the action of the auxiliary belt 120.

As shown in FIG. 4 it is envisaged that the number of robots 31,32 may be increased by adding further robots 131,132—two in the example shown—associated with the first and/or second transport section. The further robots 131,132 of each section 21,22 may be controlled in a manner coordinated with the first respective robots 31,21 also without varying the detection system and using the same cameras 61,62. The addition of further robots 131,132 allows a further increase in the overall productivity of the apparatus, which may be closer to the optimum figure where 100% of the containers are correctly handled. In addition to this it is advantageous to provide means for recovering the containers left on the transport system because they have not been correctly picked up by the robots 31,32, these devices being arranged at the outlet (O) of the return section 22 and configured to receive the containers and reintroduce them at the front of the transport system, for example supplying them to the feeding means 10. Said recovery and reintroduction operations are particularly facilitated owing to the U-shaped configuration with curved section of the transport system. According to further preferred embodiments, the temporary support plane 40 for the oriented containers 100 deposited by the robots may be realized by a conveyor belt 140 which is operated by a corresponding actuator so as to perform a suitable movement sequence coordinated with the movement of the robots.

It is moreover clear to the person skilled in the art that release to the extraction system of the articles picked up by the robots may be performed by depositing them on the support plane in a manner coordinated with the arrival of the gripping means, or by releasing them directly to the gripping means, which transport them on the support plane towards the outlet. As illustrated in FIG. 6 it is also envisaged that in the case of both the embodiments of the plane 40—belt 140—output transport system, vertical side shoulders 41 are provided, these extending parallel to the advancing direction of the containers being extracted and being able to assist the bottles when they are being deposited, in order to reduce the possibility of said bottles falling/overturning when they are put down and/or during their advancing movement towards the outlet. In this embodiment it is envisaged that the two opposite shoulders may be movable and/or motor-driven so that they can be displaced in the transverse direction Y-Y in order to adjust the interaxial distance to the actual corresponding transverse dimensions of the different containers.

Although described in connection with a number of embodiments and a number of preferred examples of implementation of the invention, it is understood that the scope of protection of the present patent is determined solely by the claims below.

The invention claimed is:

1. Apparatus for unscrambling articles, in particular containers (100), fed randomly to an inlet of said apparatus, comprising:
 a transport system (20) for transporting the articles fed to the inlet, designed to transport through the apparatus articles arranged randomly on a transport plane, said transport system (20) extending substantially in the form of a "U" with a first outward section (21) configured to transport the containers in a first advancing direction (A1) and a second return section (22) configured to transport the containers in a second advancing direction (A2) different from the first direction (A1), the two sections (21;22) being connected by a curve (23);
 pick and release devices (31;32) for picking and releasing the articles (100), configured to pick up the articles arranged randomly on the transport system (20) and release them to an extraction system (50) with a predefined orientation and/or position;
 said extraction system (40;140,50) for extracting the articles (100) arranged with a predefined orientation and/or position;
 a detection system (60) designed to detect the position and the arrangement of the articles (100) in transit on the transport system and to provide information for controlling the pick and release devices (30);
 a unit (500) for processing and controlling components and drives of the apparatus, designed in particular to receive the information about the position and/or arrangement of the articles and to control the pick and release devices (30);
wherein the extraction system comprises:
 a support plane (40;140) for supporting the articles (100) being extracted;
 means (50;150) for extracting the articles (100), designed to pick up the articles released by the pick and release devices (31;32) and transport them on the support plane (40;140) towards an outlet ("O") of the apparatus;
wherein said extraction means comprise a plurality of grippers (50;150), each comprising a pair of jaws (51;151) and each gripper (50;150) is displaceable along a fixed guide (55) independently of one or more of the other grippers (50;150);
and wherein the support plane (40) of the extraction system is arranged equidistant from the first outward section (21) and from the second return section (22) of the transport system.

2. Apparatus according to claim 1, characterized in that each jaw (51;151) of a gripper (50;150) is mounted on a carriage (54) which is displaceable on the fixed guide (55) independently of the carriage (54) on which the other jaw (51;151) of the gripper is mounted.

3. Apparatus according to claim 2, characterized in that the carriages (54) can be operated independently of each other by means of drives which can be controlled by the processing and control unit (500) and are configured to vary an advancing speed of said carriages (54) along the guide (55).

4. Apparatus according to claim 2, characterized in that each jaw (51;151) is mounted on a first end (52a) of a respective arm (52), the other end of which is joined to the respective movable carriage (54) and/or in that the drive of each carriage comprises a linear motor comprising electrical windings mounted on the fixed guide (55) and permanent magnets mounted on each carriage (54).

5. Apparatus according to claim 1, characterized in that said fixed guide (55) extends along a closed-loop path with at least two straight sections, i.e. an outward section (55a) and a return section (55b), connected by curved connecting sections (55c).

6. Apparatus according to claim 1, characterized in that said guide (55) is inclined with respect to the plane of the transport system (20) and/or the support plane (40;140) of the extraction system, so as to avoid relative interference between said grippers (50;150) and the transport plane and/or the support plane (10;140) of the extraction system and preferably so as to position a first straight outward section (55a) of the guide in an upper position with respect to a straight return section (55b), the return section (55b) being arranged preferably underneath the said plane of the transport system (20).

7. Apparatus according to claim 1, characterized in that the jaws (51;151) of a gripper (50;150) have a substantially parallelepiped or frustoconical shape with a respective open larger base situated facing the other jaw (51;151) of the gripper (50;150).

8. Apparatus according to claim 1, characterized in that the pick and release devices (31;32) comprise at least one robot (31) arranged upstream of the curved section (23), at the first section (21) of the transport system, for picking up articles from said first section (21), and at least one robot (32) arranged downstream of the curved section, at the second section (22), for picking up articles (100) from the second section (22) of the transport system (20).

9. Apparatus according to claim 8, characterized in that the at least one pick-up robot (31) for the first section (21) of the transport system picks up only articles arranged with one or more predefined first orientations on said first section and that the at least one pick-up robot (32) for the second section (22) of the transport system picks up only articles arranged with one or more predefined second orientations, different from the one or more first orientations, on said second section.

10. Apparatus according to claim 9, characterized in that the one of more first orientations include an orientation in which the article is arranged on the transport system (20) with a first side face (105a) exposed to the detection system (60), and the one or more second orientations include an orientation in which the article is arranged on the transport plane with a second side face (105a), opposite to the first side face (105b), exposed to the detection system.

11. Apparatus according to claim 8, characterized in that the detection system comprises at least a first camera (61) and a second camera (62) arranged upstream of at least one associated robot (31,32) and designed to detect the position and the arrangement of the containers (100) in transit within its field of vision, providing information for controlling the respective robot.

12. Apparatus according to claim 1, wherein the support plane (40) of the extraction system is arranged along the line bisecting an angle formed by the curved section (23) and/or wherein said curved section (23) of the transport system covers an angle greater than or equal to 160°, preferably equal to about 180°.

13. Apparatus according to claim 1, characterized in that the advancing direction (A2) of the second return section (22) is parallel to and substantially in the opposite sense to the advancing direction (A1) of the first outward section (21) and/or wherein the extraction direction along the support plane of the extraction system is parallel to and in the same sense as the advancing direction (A2) of the second transport section (22).

14. Apparatus according to claim 1, characterized in that said support plane (40;140) for supporting the containers (100) being extracted comprises vertical side shoulders (141) extending parallel to the advancing direction (A1, A2).

15. Apparatus according to claim 14, wherein the two vertical shoulders (141) are movable and/or motor-driven so as to be able to be displaced in the transverse direction (Y-Y) in order to adjust the interaxial distance between the shoulders (141).

16. Apparatus according to claim 1, characterized in that said support plane (40) is fixed or is a conveyor belt (140) operated by an associated actuator so as to perform a suitable movement sequence synchronized with the movement of the pick and release means (31,32) and/or the grippers (50;150) of the extraction system.

17. Apparatus according to claim 1, characterized in that the first section (21) and the second return section (22) of the transport system (20) are configured to be operated independently and/or with different advancing speeds.

18. Apparatus according to claim 1, characterized in that the curved connecting section (23) is configured to be operated independently and/or with a different advancing speed than the first section (21) and/or second section (22) of the transport system, and/or further comprises at least one picking and handling robot arranged and configured to operate on articles (100) in transit on the curved connecting section (23).

19. Method for unscrambling articles, in particular containers (100), fed randomly, comprising the steps of:
feeding the randomly fed articles to a transport system (20) and transporting the articles arranged randomly on a transport plane;
detecting the position and arrangement of the articles (100) in transit on the transport system (20) and emitting corresponding position and arrangement information;
picking up the articles arranged randomly on the transport system (20), based on the position and arrangement information emitted;
releasing with a predefined orientation and/or position the picked-up articles;
gripping each article released with a predefined orientation and/or position by extraction means (50;150) for extracting the articles;
extracting the articles (100) arranged with a predefined orientation and/or position;
wherein:
transportation of the articles (100) by the transport system (20) comprises the transportation along a path which extends substantially in the form of a "U" with a first outward section (21), along which the containers are transported in a first advancing direction (A1), and a second return section (22), along which the containers are transported in a second advancing direction (A2) different from the first direction (A1), and with a curved section (23) which connects the first and second sections (21,22);

the step of gripping the articles is performed by means of a plurality of grippers (50;150), each comprising a pair of jaws (51;151) between which a released article is gripped; and the extraction step is performed by displacing each gripper (50;150) along a fixed guide (55) independently of one or more of the other grippers (50;150),
gripping and/or extraction of the released articles being performed at and/or at least partly along an extraction support plane (40;140) which is arranged equidistant from the first outward section (21) and the second return section (22) of the transport system (20).

20. Method according to claim 19, wherein each jaw (51;151) of a gripper (50;150) is displaced along the fixed guide (55) independently of the other jaw (51;151) of the said gripper.

21. Method according to claim 19, characterized in that one or both of the jaws of a gripper vary their speed during movement along the guide (55).

22. Method according to claim 19, characterized in that the movement of a gripper (50) or a jaw (51) along the fixed guide (55) follows a closed-loop path with at least two straight sections, i.e. an outward section (55*a*) and a return section (55*b*), connected by curved connecting sections (55*c*).

23. Method according to claim 22, characterized in that the fixed guide (55) is arranged inclined with respect to the plane of the transport system (20) and/or the support plane (40;140) of the extraction system so as to avoid relative interference between said grippers (50;150) and the transport plane and/or the plane (10;140) of the extraction system during movement of the grippers for the gripping and/or extraction step, the first straight outward section (55*a*) being arranged in an upper position and the straight return section (55*b*), situated opposite the first section, being arranged in a lower position, preferably underneath said plane of the transport system (20).

24. Method according to claim 19, wherein the movement of the jaws of a gripper (50) is coordinated with the release of an article by a pick and release devices (30), so that the jaws are arranged in a first spaced position upon arrival of the article and then in a second closed position for gripping the article (100).

25. Method according to claim 19, characterized in that the extraction step comprises transportation of the article performed by displacing the jaws (51;151), closed around the article towards an outlet (O) and subsequent release of the article (100) by the jaws (51;151).

26. Method according to claim 25, wherein release of the article by the jaws (51;151) comprises entry of the jaw arranged downstream in the extraction direction along a curved return section of the inclined guide, continuation of the article towards the outlet, and entry of the upstream jaw along the curved return section of the inclined guide.

27. Method according to claim 19, characterized in that the picking and releasing step is performed by at least one robot (31) arranged at the first section (21) for picking up articles from said first section (21) and by at least one robot (32) arranged to pick up articles (100) from the second section (22) of the transport system (20).

28. Method for unscrambling articles according to claim 19, wherein the advancing direction (A2) of the second return section (22) is substantially opposite and parallel to the advancing direction (A1) of the first outward section (21) and/or wherein the extraction direction along the support plane (40;140) is parallel to and in the same sense as the advancing direction (A2) of the second transport section (22).

29. Method for unscrambling articles according to claim 19, wherein the first section (21), the second return section (22) and/or the curved section (23) of the transport system (20) are operated independently and/or with different advancing speeds.

30. Method for unscrambling articles according to claim 19, wherein the extraction support plane (40) is arranged along a line bisecting an angle spanned by the curved section (23).

* * * * *